United States Patent
Fukuda et al.

(10) Patent No.: US 7,987,404 B2
(45) Date of Patent: Jul. 26, 2011

(54) INFORMATION RECORDING DEVICE, DATA-FLOW CONTROLLER AND DATA FLOW CONTROLLING METHOD

(75) Inventors: Junichi Fukuda, Gunma-ken (JP); Hisato Matsuo, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 646 days.

(21) Appl. No.: 11/721,446

(22) PCT Filed: Dec. 21, 2005

(86) PCT No.: PCT/JP2005/023488
§ 371 (c)(1),
(2), (4) Date: Jun. 9, 2008

(87) PCT Pub. No.: WO2006/070668
PCT Pub. Date: Jul. 6, 2006

(65) Prior Publication Data
US 2008/0320361 A1    Dec. 25, 2008

(30) Foreign Application Priority Data
Dec. 28, 2004   (JP) ................................ 2004-378509

(51) Int. Cl.
*H03M 13/00*   (2006.01)
(52) U.S. Cl. ...................................... 714/752; 714/763
(58) Field of Classification Search ................... 714/752, 714/763
See application file for complete search history.

(56) References Cited

U.S. PATENT DOCUMENTS

| 7,042,667 B2 * | 5/2006 | Maple et al. ..................... 360/51 |
| 2004/0098661 A1 | 5/2004 | Chuang et al. |
| 2006/0156189 A1 * | 7/2006 | Tomlin .......................... 714/763 |

FOREIGN PATENT DOCUMENTS

| EP | 0913826 A1 | 5/1999 |
| FR | 2714498 A1 | 6/1995 |
| JP | 02-162430 | 6/1990 |
| JP | 02-193366 | 7/1990 |
| JP | 2001-177419 | 6/2001 |
| JP | 2001-266509 A | 9/2001 |

OTHER PUBLICATIONS

ECMA; "Data Interchange on 12,7 mm 384-Track Magnetic Tape Cartridges—Ultrium-1 Format"; Standard ECMA-319; Jun. 2001; pp. 71-77; URL: http://www.ecma.ch.
Bate, S. D. et al., Error control techniques applicable to HF channels; IEE Proceedings, vol. 136, Pt 1, No. 1, Feb. 1989; pp. 57-63.
Jacquette, G. A., "LTO: A better format for mid-range tape"; IBM J. Res. & Dev., vol. 47, No. 4, Jul. 2003; pp. 429-444.
European Patent Office, Patent Application No. EP 05820131.0; Communication and extended European search report dated Mar. 6, 2009.

* cited by examiner

*Primary Examiner* — Sam Rizk
(74) *Attorney, Agent, or Firm* — Griffiths & Seaton PLLC

(57) ABSTRACT

A method for transferring corrected data to an external buffer within a tape drive is provided. After the receipt of data from a data recording medium, the data are stored in an external buffer. The data are then transferred from the external buffer to an error correction code (ECC) device. Any error in the data within the ECC device are corrected. The corrected data are subsequently divided into multiple sub-units, and a transfer flag is added to each of the sub-units having corrected data. Only the sub-units having corrected data are transferred from the ECC device back to the external buffer.

12 Claims, 6 Drawing Sheets

INFORMATION RECORDING DEVICE, DATA-FLOW CONTROLLER AND DATA FLOW CONTROLLING METHOD

CROSS REFERENCE TO RELATED APPLICATIONS

The present application claims benefit of priority under 35 U.S.C. §365 to the previously filed International Patent Application No. PCT/JP2005/023488 entitled, "Information recording device, data flow controller and data flow controlling method" having an international filing date of Dec. 21, 2005, which is incorporated by reference herein.

BACKGROUND OF THE INVENTION

1. Technical Field

The present invention relates to an information recording device for transferring data recorded on a recording medium in general, and in particular to a linear tape open (LTO) drive for transferring corrected data to an external buffer from an error correction code (ECC) engine.

2. Description of Related Art

When data is recorded by a typical information recording device, the data received from a host is temporarily stored in an external buffer. The stored data is then transferred to an error correction code (ECC) engine, and an ECC parity (such as C2 correction code) is generated. Thereafter, a C2 parity, for example, is added to the data, and the data is returned to the external buffer. Subsequently, the data having the parity added thereto is recorded on a recording medium. When the data on the recording medium need to be transferred back to the host, the data read from the recording medium is temporarily stored in the external buffer. The stored data is transferred, while having the ECC parity added thereto, to the ECC engine. The ECC engine corrects any error data and rewrites the data to the external buffer. The corrected data rewritten in the external buffer is subsequently sent to the host.

The present disclosure provides a tape drive for efficiently transferring corrected data from an ECC engine to an external buffer.

SUMMARY OF THE INVENTION

In accordance with a preferred embodiment of the present invention, after the receipt of data from a data recording medium, the data are stored in an external buffer. The data are then transferred from the external buffer to an error correction code (ECC) device. Any error in the data within the ECC device are corrected. The corrected data are subsequently divided into multiple sub-units, and a transfer flag is added to each of the sub-units having corrected data. Only the sub-units having corrected data are transferred from the ECC device back to the external buffer.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
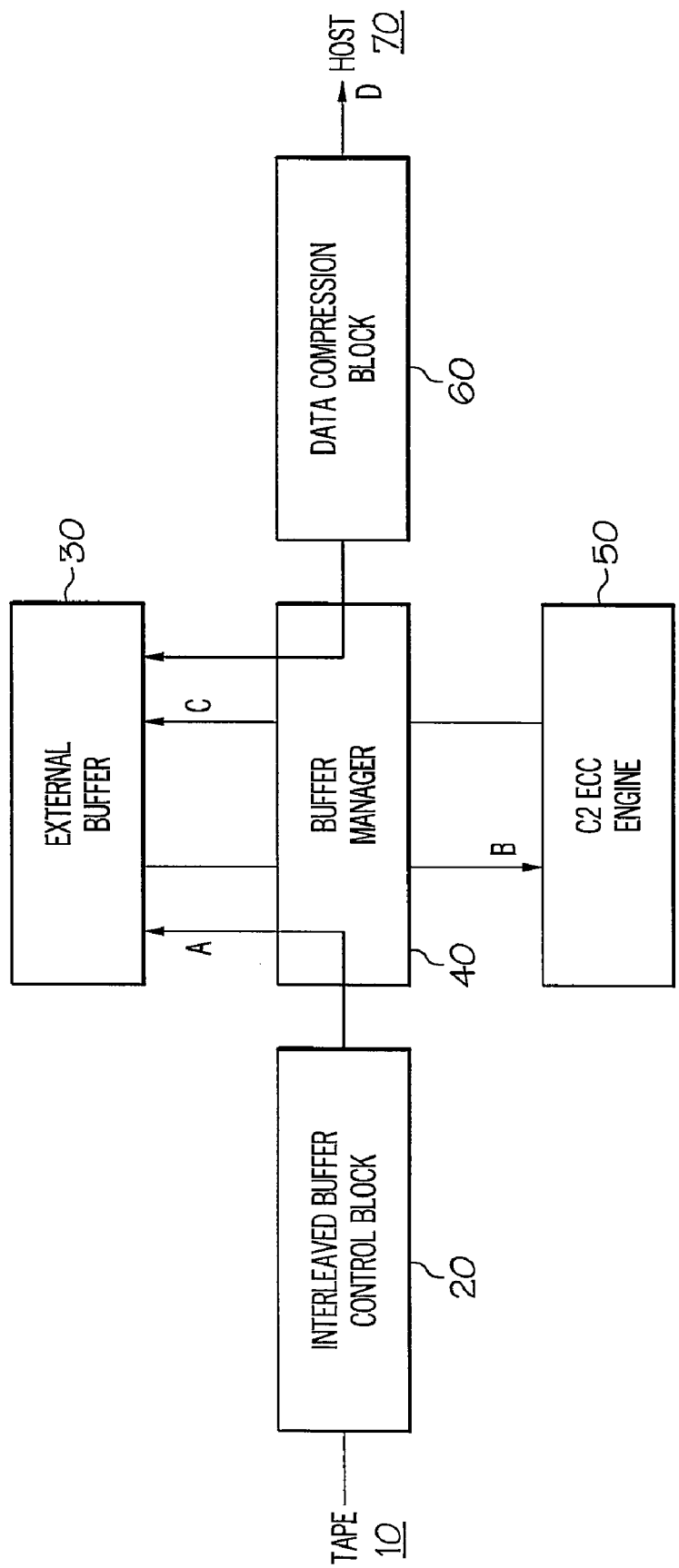
FIG. 1 is a block diagram of an input/output mechanism within a linear tape open drive for transferring data between a tape and a host.

Referring now to the drawings and in particular to FIG. 1, there is depicted a block diagram of an input/output mechanism within a linear tape open (LTO) drive for transferring data between a tape 10 and a host 70. Arrows A to D indicate steps of a transfer flow for data read from tape 10. The data read from tape 10 is temporarily written into an external buffer 30 by a buffer manager 40 (step A). External buffer 30 can be, for example, a DDR SDRAM having a bus width of 4 bytes or 8 bytes since a broad bandwidth is required. The data written into external buffer 30 is transferred to an SRAM within a C2ECC engine 50 (step B). C2ECC engine 50 corrects errors in all the data and rewrites the corrected data into external buffer 30 (step C). The corrected data is transferred as needed from external buffer 30 to host 70 according to a request (step D).

As described above, external buffer 30 can be accessed for Read or Write by tape 10, host 70 or C2ECC engine 50. Buffer manager 40 controls the data access to external buffer 30. Buffer manager 40 functions as a data flow controller. The data (data set) read from tape 10 is transferred by an interleaved buffer control 20 by each code word pair (CWP) in each row of a sub-data set, as will be described in FIG. 2. A CWP is stored in external buffer 30 by buffer manager 40 (step A). The data is compressed as needed and transferred to host 70 (step D). As the function of the data flow controller, buffer manager 40 switches between buses in a time-sharing manner so as to enable each of blocks 20, 50 and 60 to efficiently access external buffer 30. The need for data read from external buffer 30 to be written back into external buffer 30 imposes a high demand for processing time on C2ECC engine 50.

The restriction of data transfer time will be further extended since data processing performance twice higher than that of the second generation LTO drive is required for the third generation LTO drive. Moreover, recording density of the third generation LTO drive is 1.8 times higher than that of the second generation LTO drive. For this reason, it is predicted that data error rate will also be increased. Accordingly, in realization of faster transfer of recording data, how efficiently read data can be transferred becomes very important.

In a conventional storage device, fast transfer of read data is often executed by improvement of components related to a data flow, such as C2ECC engine 50 and external buffer 30, and by improvement in performance. For example, in the third generation LTO drive, compared to the second generation LTO drive, a data transfer speed defined by the specification can be achieved by performance improvement in each of the components, such as (1) improving performance of C2ECC engine 50 itself (maybe three times or more higher than that of the conventional case), (2) setting higher an operation clock to external buffer 30, and (3) increasing the bus width of external buffer 30.

From the viewpoint of compatibility concerning data read and write between each of the generations of LTO drives and economic efficiency of a product price, data transfer efficiency is limited only by simply using high-performance components. If there is a problem with the control flow of data read from a tape recording medium when corrected data is transferred from C2ECC engine 50 to external buffer 30, the problem needs be solved.

Generally, by utilizing a DDR SDRAM as external buffer 30, burst access can be realized. Since total data transfer to external buffer 30 can be executed by using burst transfer, fast data transfer can be realized. However, in the total data transfer, since all the data are transferred regardless of presence of corrected data, inefficiency in data transfer is incurred.

Meanwhile, the prior art can provide fast access to an external buffer in a digital VTR including an error correction device having a product code (an internal code and an external code). In order to achieve the above-mentioned objective, all input data are transferred to an internal code/external code correction device, and the corrected data are burst-transferred by bank switching. However, with all the data being burst-transferred to the external buffer regardless of the presence of corrected data, the data transfer efficiency between a product code error correction device and the external buffer is still not improved.

The present invention relates to an information recording device for recording data on an information recording medium such as a tape, wherein the data come from a host device after error correction code (ECC) have been added to the data. Any error occurred during data read from the information recording medium can be corrected by using the ECC. The information recording device includes an external buffer (such as external buffer 30) for temporarily storing the data read from an information recording medium (such as a tape 10), an error correction device (such as C2ECC engine 50) for correcting any error in the data transferred from the external buffer (which divides the corrected data into a set of sub-units, and adds a transfer flag to the sub-units including the corrected data), and a data flow device (such as buffer manager 40) for transferring to the external buffer only a sub-unit of data having the transfer flag added thereto when the corrected data is to be transferred from the ECC device to the external buffer and for rewriting only a part corresponding to the sub-unit of the data stored in the external buffer.

The data in a two-dimensional byte matrix in an external buffer within the information recording device preferably contains a sub-data set that includes 64 rows×480 columns, 64 rows×484 columns, 64 rows×488 columns or 64 rows×492 columns. The data in the two-dimensional byte matrix in the external buffer thereof is characterized in that 480, 484, 488 or 492 bytes of each row include a first correction code (p=12, 16, 20 or 24 bytes) in 468 bytes of the user data, 64-byte data in each column includes the user data of 54 bytes and a second correction code (q=10 bytes).

When the data is being transferred from the external buffer to the error correction device, the data flow device transfers a sub-data set stored in the external buffer by using a unit (64×x), as a unit, having a two-dimensional byte matrix in which an integral multiple (x bytes) of a bus width of the external buffer is set to be a division unit 5 for 480, 484, 488 or 492 bytes in the row direction.

The error correction device divides the unit (64×x) transferred from the external buffer into multiple sub-units (y×x) in a two-dimensional byte matrix by a unit of y rows, and adds a transfer flag to a sub-unit corrected during error correction.

In addition, the data flow device transfers only the sub-unit having the transfer flag added thereto, and rewrites a part corresponding to the sub-unit in the external buffer. The sub-units of data are a two-dimensional byte matrix of 8×4, 8×8, 8×16, 8×32 or 8×64, which is obtained by dividing M=64 in the column direction by a unit of y=8 rows.

The information recording device of the present invention also includes a linear tape open (LTO) drive having a head with multiple write and read channels for recording and reading data in a running direction (length direction) of a tape recording medium. Within the LTO drive, the tape recording medium is divided into data bands corresponding to the head in a width direction. Each of the data bands is divided into multiple data sub-bands corresponding to the respective channels in the head. Each of the data sub-bands includes multiple tracks accessed by one of the channels. Moreover, code word pairs (CWPs) in each of the rows of the sub-data set stored in the external buffer are sequentially written into tracks in the other data sub-band at a predetermined interval specified by a rotation method. Furthermore, only the sub-unit having the transfer flag added thereto is transferred to the external buffer during error correction.

The LTO drive of the present invention includes a head with 16 channels. The tape recording medium is divided into 4 data bands, each of the data bands is divided into 16 data sub-bands, and each of the data sub-bands includes 11 tracks. Moreover, the LTO drive of the present invention is not limited to the above configuration. For example, it is also possible to realize an LTO drive having a configuration in which a head has 8 channels, each of data bands is divided into 8 data sub-bands, and each of the data sub-bands includes 12 or 16 tracks. Within the LTO drive of the present invention, the CWPs in each of the rows of the sub-data set are sequentially written into tracks in the other data sub-band by shifting six or one of the data sub-bands.

The present invention also includes a data flow controller for controlling a data flow in an information recording device for recording on a recording medium data obtained by adding an error correction code to user data of multiple bytes transferred from a higher-level host device, which corrects an error in the data read out in response to a request from the higher-level host device by using the ECC, and which transfers the user data from the corrected data to the higher-level host device. The data flow controller includes an error correction device for receiving data read from the data recording medium and temporarily stored in an external buffer, for correcting any error in the data to generate corrected data, for dividing the corrected data into multiple sub-units, and for adding a transfer flag to the sub-units including the corrected data; and a data flow device for transferring to the external buffer only a sub-unit having the transfer flag when the corrected data is to be transferred to the external buffer, and for rewriting only a part corresponding to the sub-unit in the data stored in the external buffer.

A third generation LTO magnetic tape drive will be described in detail according to a best mode for carrying out the present invention. However, data flow control of the present invention is not limited to the illustrated embodiment but can be applied to each and every generation of LTO drives and other information recording devices for correcting errors due to a defective medium and defective write and read channels by using an ECC.

In the LTO system, a unit of data to be transferred is called a data set. A data set includes a group of (for example, 16 or 64) sub-data sets. Under the control of a buffer manager, the data transferred is temporarily stored in an external buffer by the sub-data set as a unit.

Figure 2:
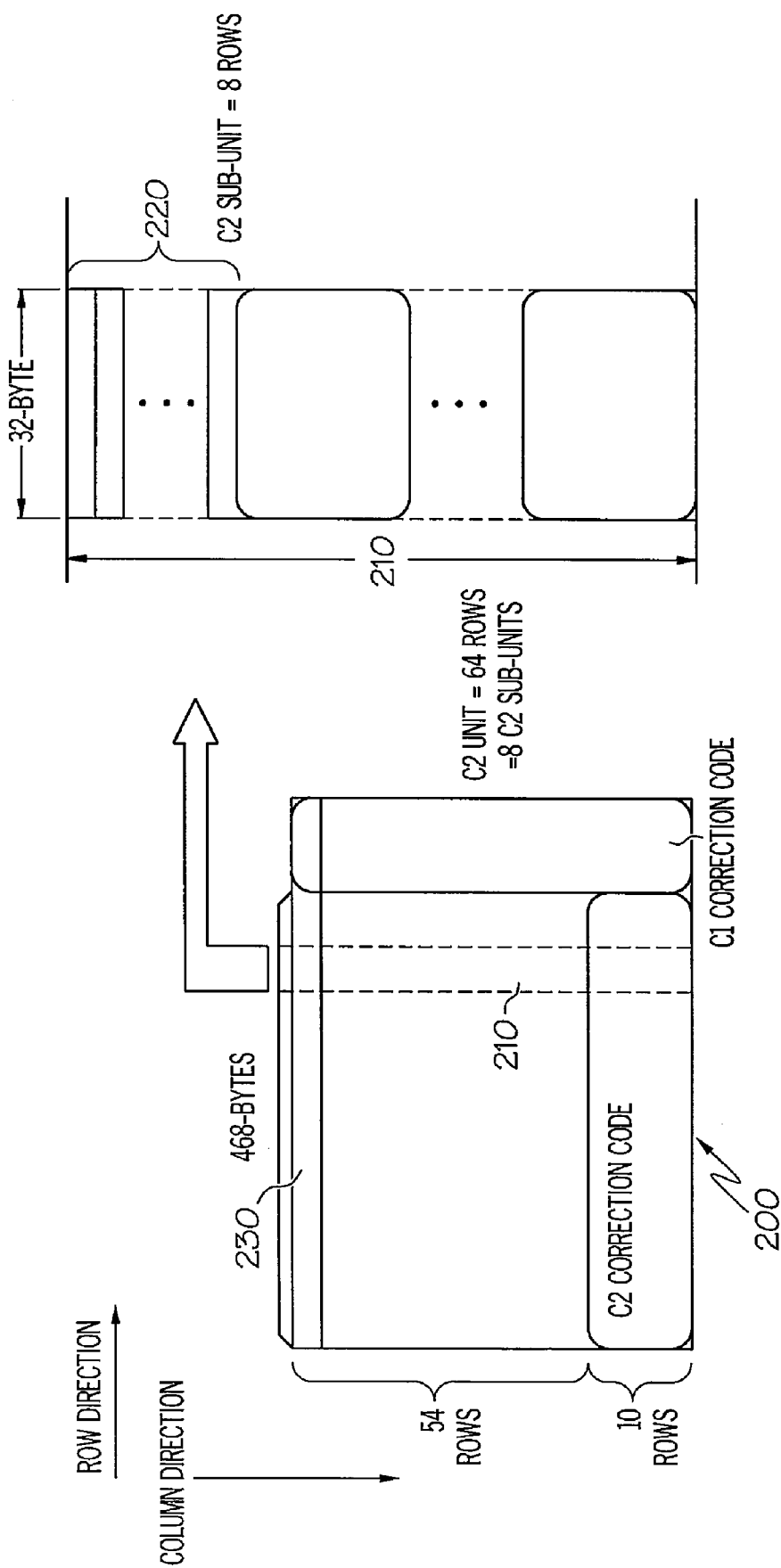
FIG. 2 shows the format of a sub-data set.

FIG. 2 shows a sub-data set 200 and a unit (i.e., a C2 unit 210 and a C2 sub-unit 220) of data transferred between an external buffer (such as external buffer 30 from FIG. 1) and an error correction device (such as C2ECC engine 50 from FIG. 1). As shown, one row (480 bytes, 484 bytes, 488 bytes, 492 bytes or the like) obtained by adding a C1 correction code (12 bytes, 16 bytes, 20 bytes, 24 bytes or the like) to 468 bytes of user data is called a code word pair (CWP) 230. The data is recorded on a tape by using one CWP as a basic unit. One sub-data set is formed of 64 rows of CWPs in which 10 rows are C2 correction codes. A data set is an unit read from the tape. Within one data set, a sub-data set is used as a basic unit and 64 sub-data sets are sequentially piled up. When this data set is transferred to external buffer 30, sub-data set 200 is used as a unit and the sub-data sets are sequentially and temporarily stored. A C1 parity is not written back into external buffer 30 since the C1 parity is added (on the fly) while transferring 468 bytes of the user data in CWP 230. C2ECC engine 50 generates 10 bytes of the C2 correction code for 54 bytes in a vertical direction (a column direction).

The following discussion is also applicable to a multi-dimensional ECC engine. A unit of data transferred from external buffer 30 to C2ECC 50 is called a C2 unit 210 obtained by dividing the sub-data set in the column direction. A data flow controller of the LTO drive divides the CWP in the row direction by 32 bytes as C2 unit 210 and transfers 32 columns thereof as a unit from external buffer 30 to error correction device 50.

C2 sub-unit 220 is obtained by dividing C2 unit 210 in the column direction into 8 sub-units, each sub-unit including 8 rows. A size of C2 sub-unit 220 (32 bytes×8 rows) is a minimum unit of one transfer cycle to external buffer 30. While the unit of data sent from external buffer 30 to C2ECC engine 50 is C2 unit 210, the unit of data rewritten into external buffer 30 is C2 sub-unit 220 obtained by dividing C2 unit 210. When corrected data is included in 256 bytes (32 bytes×8 rows) of C2 sub-unit 220, the data flow controller rewrites C2 sub-unit 220 into external buffer 30. Meanwhile, C2 sub-unit 220 having no corrected data in C2 unit 210 is not returned to external buffer 30. When the corrected data is unevenly distributed in C2 unit 210, only C2 sub-units having the corrected data may be transferred. Because unnecessary transfer of C2 units is reduced, data transfer efficiency is improved. As a result, power consumption of the LTO drive can be reduced.

Figure 3:
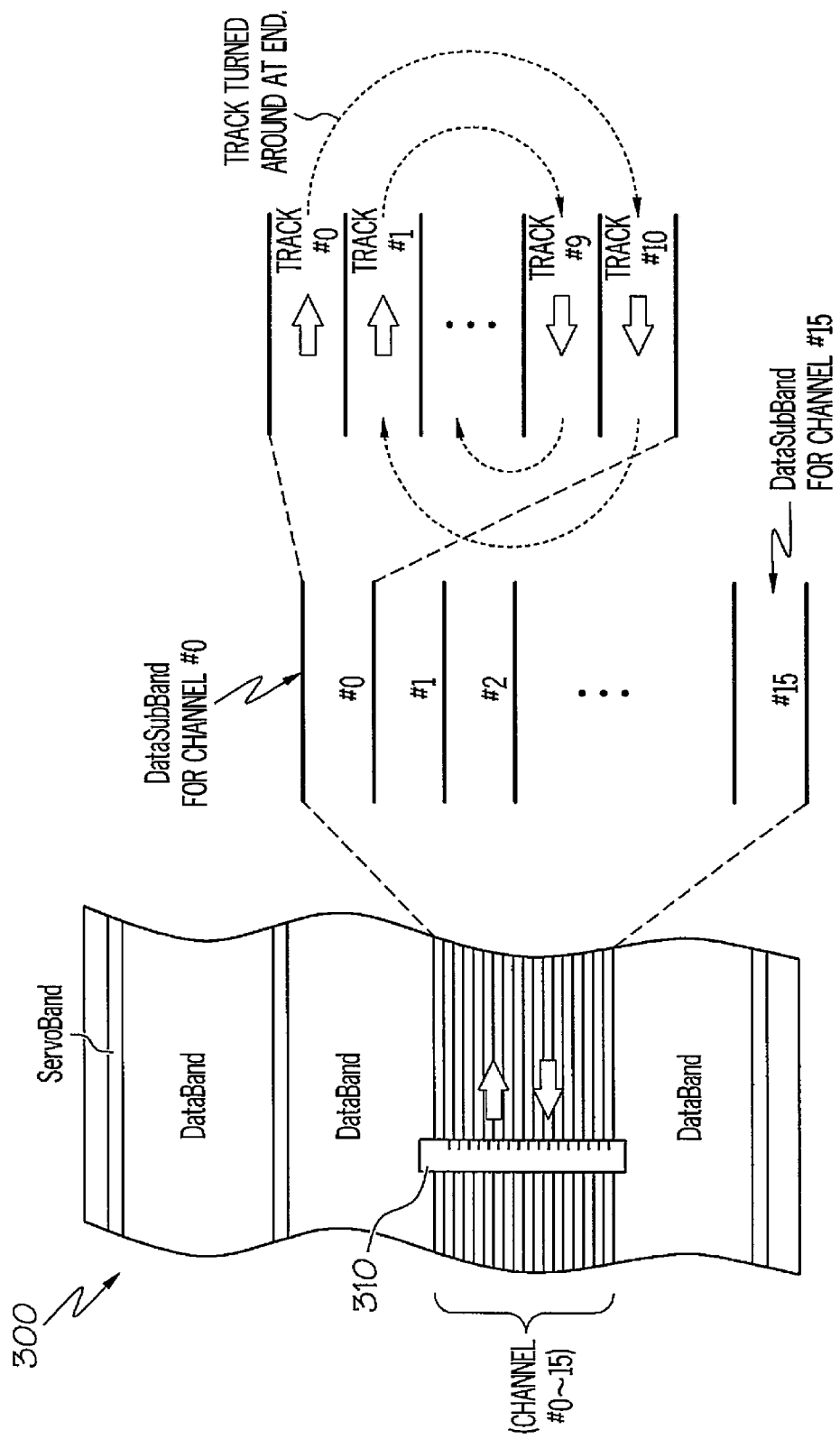
FIG. 3 shows the track format of a tape.

FIG. 3 illustrates a physical format of a track on an LTO tape 300. A defect such as dust and a scratch on tape 300 and defective read and write channels may cause data errors. By considering an adverse affect that a defect on tape 300 has on sub-data set 200, C2 unit 210 or C2 sub-unit 220, a write method called rotation of the CWP in each row can be utilized to correct the defect. First, description will be given of a positional relationship between C2 sub-unit 220 and the track on the LTO tape. On a magnetic tape, potential defects exist. Since the third generation LTO tapes are required to have recording density higher than those of the second generation LTO tapes, tracks (data) on the tape are easily affected by the defects. Consequently, in the LTO tape, writing by rotation of CWP 230 in each row of sub-data set 200 is done by considering shapes and positions of the defects on the LTO tape.

FIG. 3 shows the track format of an LTO tape. As shown, a tape 300 is divided in its width direction into four data bands by servo bands. A tape head 310 reads and writes each of the data bands. Each data band includes a set of (for example, 16) data sub-bands. The respective data sub-bands (#0 to #15) are accessed by corresponding channels (#0 to #15) included in one tape head 310. FIG. 3 also shows a track structure in one data sub-band accessed by one channel in the tape head. In the third generation LTO tape, one data sub-band includes 11 tracks. The 11 tracks are accessed by one channel while changing directions. One channel first accesses an outer physical track as indicated by an arrow. When reaching an end of the track (in other words, an end of the tape), the channel turns to and accesses a track on an opposite side indicated by a dotted line. As described above, every time the channel reaches the end of the tape, the tracks are accessed by the channel while changing the directions sequentially from the outer track to an inner track. The tracks at the same position in the 16 data sub-bands are simultaneously accessed one by one in parallel by the 16 channels (#0 to #15) in the tape head.

Figure 4:
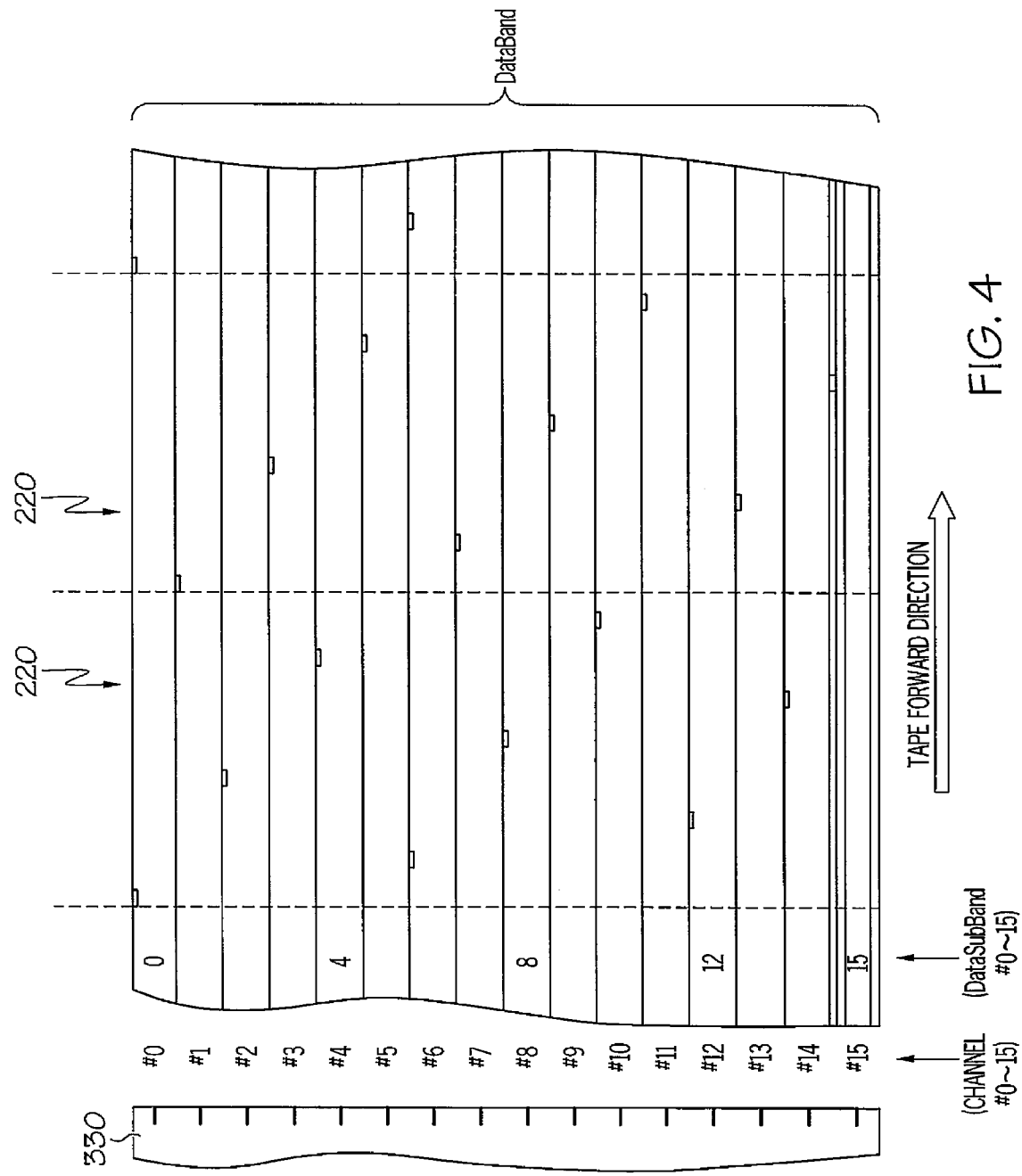
FIG. 4 shows the positional relationship between a data band shown in FIG. 3 and a CWP in each row of a sub-data set.

FIG. 4 shows the positional relationship between a data band shown in FIG. 3 and a CWP in each row of a sub-data set.

In a LTO tape, in order to reduce the adverse affect of the defect on one sub-data set 200, the data (CWP) in each row of the sub-data set is written into another data sub-band by another channel. The data transferred from the host is written into the tracks in the data sub-band using the CWP as a unit by each of the 16 channels included in the tape head. For writing of the next CWP, the data sub-bands #, into which the data is to be written, are shifted in order to disperse errors due to the defect. FIG. 4 shows a mode of writing the CWP in each row of one sub-data set by use of a rotation method for sequentially shifting six data sub-bands. For example, one CWP in one sub-data set is recorded by the channel #0 on tracks in the corresponding data sub-band #0. The CWP in the next row is recorded on tracks in the data sub-band #6 by channel #6.

The CWPs in each of the rows of sub-data set 200 are sequentially recorded towards the right side on the tracks in the 16 data sub-bands #0 to #15 in the vertical direction. Each of packets in black shown in FIG. 4 means CWP 230 (FIG. 2) in one row. The black packets are the CWPs in each of the rows of the same sub-data set and correspond to the CWPs in the rows of the sub-data set sequentially from the left. For example, the leftmost packet on the track in the data sub-band #0 corresponds to the CWP in the first row of sub-data set 200 shown in FIG. 2. Next, the packet in the data sub-band #6 corresponds to the CWP in the second row of the same sub-data set, and the packet in the data sub-band #12 corresponds to the CWP in the third row of the same sub-data set. Although the black packet (CWP) has a width of one track, the width of each packet (CWP) is enlarged and shown in FIG. 4 for convenience of explanation.

In FIG. 4, the first 8 packets are included in the same C2 sub-unit 220 (see FIG. 2). FIG. 4 shows the data (CWPs) included in the same C2 sub-unit 220 by using dotted lines to separate the data from that in another sub-unit.

Figure 5:
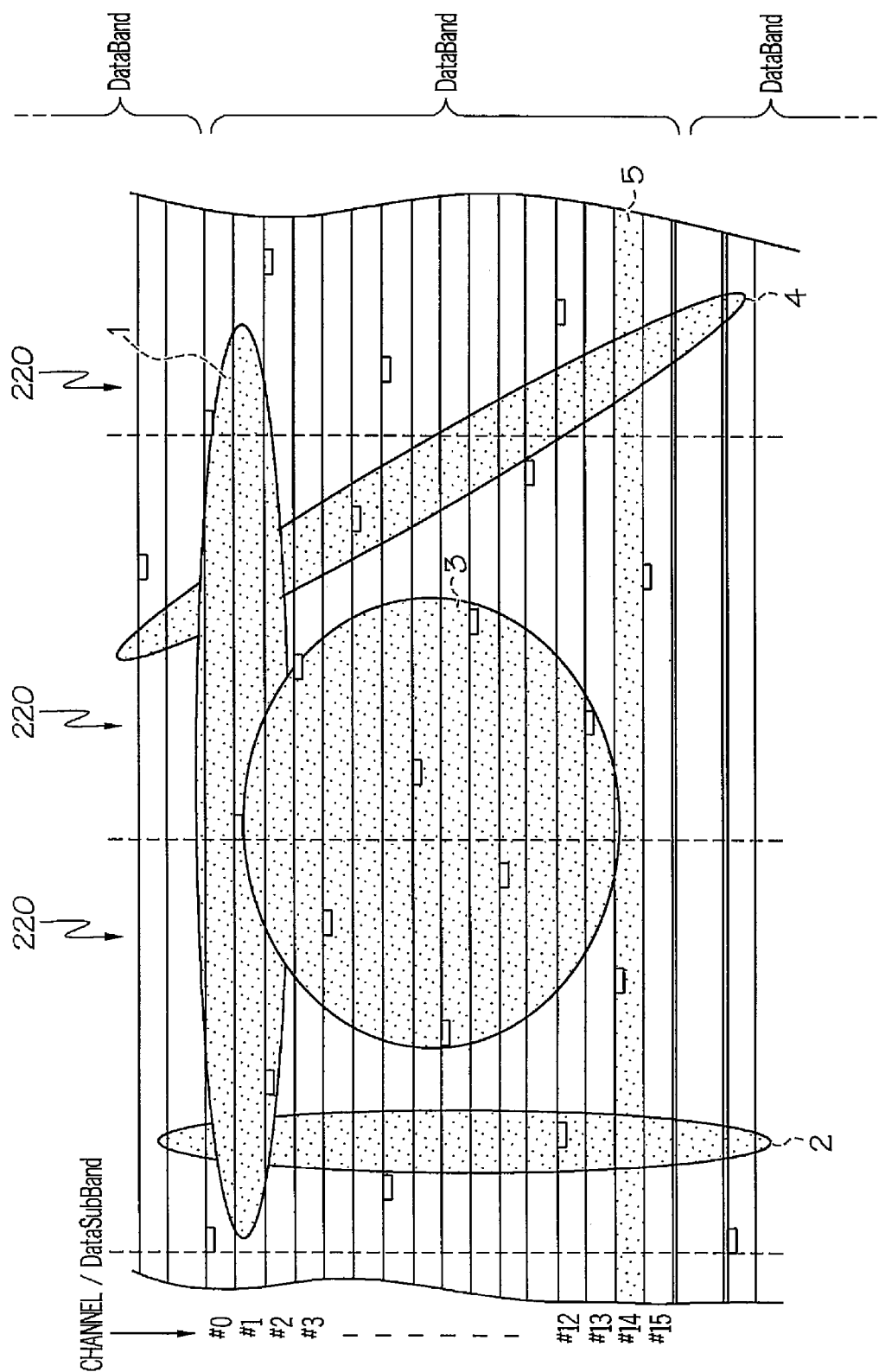
FIG. 5 shows an example of a defect distribution on a tape.

FIG. 5 shows an example of a defect distribution in one data band on an LTO tape. Read errors caused by defects on an LTO tape are classified into several types according to the defects such as adhesion of dust and the like, scratches and defective channels. From the viewpoint of the adverse affect of the defects on correction ability of the C2ECC engine, shapes of the defects are classified into the following five types. Note that the defects are assumed to be those having a band shape with a width of about 5 mm or those having a width of about 10 mm. When the defects are larger than those described above, the C2ECC engine often cannot correct the sub-data set. Moreover, minor read errors can be sufficiently corrected by the C1ECC engine using a C1 correction code.

Description will be given of adverse affect (errors) that various defects 1 to 5 shown in FIG. 5 have on C2 unit 210 in sub-data set 200.

1. Defect in tape running direction:
    Correction is executed over three C2 sub-units.

2. Defect in tape lateral direction across more than one data band:
   Adjacent data bands are different data, and correction of one C2 sub-unit is executed.
3. Circular defect:
   Correction of two C2 sub-units is executed.
4. Narrow defect in tape diagonal direction:
   Adjacent data bands are different data, and correction of one or two C2 sub-units is executed.
5. One track cannot be read and a certain channel cannot read:
   Correction is executed for every other C2 sub-unit.

The last defect (defect 5) is called a dead track, which is an error due to a defective channel or the like. In the example shown in FIG. 5, defect 5 represents a case where the entire data sub-band #14 cannot be read. In this case, the packets (CWPs) included in the data sub-band #14 are included in every other C2 sub-unit. Moreover, it is required to correct four errors among the eight C2 sub-units in one C2 unit.

Particularly, in the case where the CWPs in each of the rows of the sub-data set are recorded on the tape by using the rotation method described above, there is hardly any influence of the defects continuous in a track direction (the types 1 and 5 in FIG. 5). Even when C2 unit 210 shown in FIG. 2 includes error data, there often arises a case where the error data is focused in a specific C2 sub-unit 220 and is not included in other C2 sub-units 220. Similarly, in the defects extended in the tape width direction in FIG. 5 (the types 2 to 4), errors are included in about two out of the eight C2 sub-units. In the case where C2 unit 210 is returned from C2ECC engine 50 to external buffer 30 for the both types of errors, a transfer flag is set up for each of the C2 sub-units depending on presence of errors, and only the sub-units required are transferred from C2ECC engine 50. Thus, transfer efficiency of the external buffer can be improved.

In the case of such typical defects, data correction for only about two C2 sub-units is required in most of the cases. The C2 sub-units to be transferred from C2ECC engine 50 to external buffer 30 can be limited to two out of the eight C2 sub-units in the C2 unit.

Furthermore, the above reduction in the C2 sub-units to be transferred also has an effect of reduction in power consumption of a system including also the buffer. The third generation LTO drives areas required to realize faster transfer compared to the second generation LTO drives. Thus, the bus width of external buffer 30 is increased from 4 bytes in the second generation to 8 bytes. Consequently, in the third generation LTO drives, 8 bytes is defined as 1 word. The data flow controller of the LTO drive transfers 168 words in total to external buffer 30 in one bus cycle. A band width of the C2ECC engine occupies one C2 sub-unit, in other words, 32 words out of 168 words. Specifically, a bus occupancy rate in C2 correction is 19% (=32/168). In consideration of distribution properties of C2 corrected data in the LTO drive, it is often the case that only two C2 sub-units are transferred from the C2ECC engine to the external buffer. Consequently, by adopting a function of transferring only the corrected C2 sub-units by the data flow controller, bus bandwidth efficiency can be reduced by up to 5% (19%×⅜) in the LTO drive.

Even if a data dispersion method (for example, rotation) for avoiding defects locally existing in specific portions on the tape is applied in the third generation LTO as described above, there is a characteristic that data errors still appear while being concentrated in specific spots (the C2 sub-units) in the sub-data set (or the C2 sub-units). In consideration of the above characteristic, a range of application of the present invention to the LTO drive is considered to be extended in the future. Note that, in each of the first and second generation LTO systems, the number of data bands is 4, the number of channels and data sub-bands is 8, the number of tracks is 12 or 16, and the number of shifts in the data sub-bands in the rotation method is 1.

Figure 6:
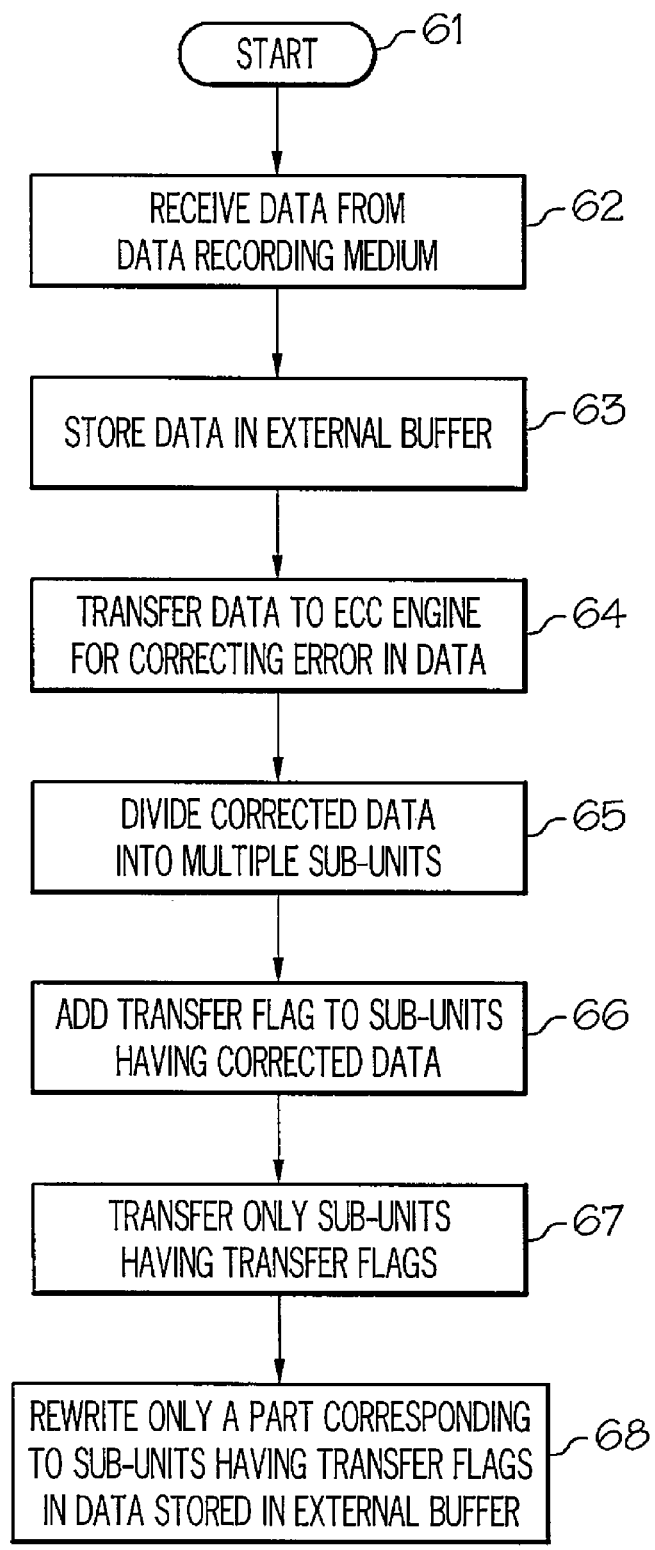
FIG. 6 illustrates a method for transferring corrected data to an external buffer.

FIG. 6 illustrates a method for transferring corrected data to an external buffer. Starting in block 61, data are received from a data recording medium such as an LTO tape, as shown in block 62. The data are temporarily stored in an external buffer, as depicted in block 63. The data are then transferred to an ECC engine, and any error in the data is corrected at this point, as shown in block 64. The corrected data are then divided into multiple sub-units, as depicted in block 65, and a transfer flag is added to a sub-unit having the corrected data, as shown in block 66. When the corrected data is to be transferred to the external buffer, only the sub-units having the corresponding transfer flags are transferred to the external buffer, as depicted in block 67, and only the part in the data stored in the external buffer that corresponds to the sub-units having transfer flags are rewritten, as shown in block 68.

As has been described, the present invention provides a data flow controlling method for recording on a recording medium data obtained by adding ECC to user data of a set of bytes transferred from a higher-level device. The method of the present invention provides faster transfer of data on the recording medium as a whole as long as the data flow can be made more efficient when the corrected data is transferred from an ECC engine to an external buffer. Particularly, in terms of enabling easy application of the present invention to existing information recording devices, it is advantageous that the data on the recording medium can be efficiently error-corrected and transferred without taking into consideration improvement in performance of existing electronic components. Moreover, in the present invention, transfer of the data corrected by the error correction means can be limited to transfer of only a few error-corrected sub-units. As a result, system power consumption of the information recording device can be reduced.

The present invention is not limited to the technical field of the tape drive described above. The recent technical requirements, such as higher density of recording medium, improvement in correction ability of the ECC engine and faster transfer of data to the host, exist in all recording devices. The unit of data to be processed by the ECC engine will be increased in the future. Meanwhile, it is expected that, along with improvement in quality of recording medium, error data locally exists in specific spots in the unit of data to be processed by the ECC engine. If the data flow controlling method of the present invention can be applied to a storage device having a configuration as described above, unnecessary data transfer from the ECC engine to the external buffer can be avoided. Thus, it is possible to realize faster data transfer and reduction in power consumption of a system.

While the invention has been particularly shown and described with reference to a preferred embodiment, it will be understood by those skilled in the art that various changes in form and detail may be made therein without departing from the spirit and scope of the invention.

What is claimed is:

1. A method for transferring error corrected data to an external buffer within a tape drive, said method comprising:
   after the receipt of data from a data recording medium, storing said data in an external buffer;
   transferring said data from said external buffer to an error correction code (ECC) device;
   correcting any error in said data within said ECC device;

dividing said corrected data into a plurality of sub units;
adding a transfer flag to each of said sub units having said corrected data; and
transferring only said sub-units having said corrected data from said ECC device to said external buffer.

2. The method of claim 1, wherein said method further includes rewriting each of said sub units to corresponding data stored within said external buffer.

3. The method of claim 1, wherein said method further includes dividing a data unit transferred from said external buffer into a plurality of sub units in a two dimensional byte matrix by a unit of y rows, and adding a transfer flag to a sub unit having corrected data.

4. The method of claim 1, wherein said external buffer is a DDR SDRAM and said ECC device is an SRAM.

5. A non-transitory computer usable medium having a computer program product for transferring error corrected data to an external buffer within a tape drive, said computer usable medium comprising:
 computer program code for, after the receipt of data from a data recording medium, storing said data in an external buffer;
 computer program code for transferring said data from said external buffer to an error correction code (ECC) device;
 computer program code for correcting any error in said data within said ECC device;
 computer program code for dividing said corrected data into a plurality of sub units;
 computer program code for adding a transfer flag to each of said sub units having said corrected data; and
 computer program code for transferring only said sub-units having said corrected data from said ECC device to said external buffer.

6. The non-transitory computer usable medium of claim 5, wherein said computer usable medium further includes computer program code for rewriting each of said sub units to corresponding data stored within said external buffer.

7. The non-transitory computer usable medium of claim 5, wherein said computer usable medium further includes computer program code for dividing a data unit transferred from said external buffer into a plurality of sub units in a two dimensional byte matrix by a unit of y rows, and adding a transfer flag to a sub unit having corrected data.

8. The non-transitory computer usable medium of claim 5, wherein said external buffer is a DDR SDRAM and said ECC device is an SRAM.

9. An information recording device capable of transferring error corrected data to an external buffer within said information recording device, said information recording device comprising:
 an external buffer for storing data received from a data recording medium;
 a buffer manager for transferring said data from said external buffer to an error correction code (ECC) device;
 an ECC engine within said ECC device for correcting any error in said data within said ECC device;
 dividing said corrected data into a plurality of sub units;
 adding a transfer flag to each of said sub units having said corrected data; and
 said buffer manager for transferring only said sub-units having said corrected data from said ECC device to said external buffer.

10. The information recording device of claim 9, wherein said information recording device further includes means for rewriting each of said sub units to corresponding data stored within said external buffer.

11. The information recording device of claim 9, wherein said information recording device further includes means for dividing a data unit transferred from said external buffer into a plurality of sub units in a two dimensional byte matrix by a unit of y rows, and adding a transfer flag to a sub unit having corrected data.

12. The information recording device of claim 9, wherein said external buffer is a DDR SDRAM and said ECC device is an SRAM.

* * * * *